US010746459B2

(12) United States Patent
Roekens et al.

(10) Patent No.: US 10,746,459 B2
(45) Date of Patent: Aug. 18, 2020

(54) SYSTEMS AND METHODS FOR VACUUM COOLING A BEVERAGE

(71) Applicant: THE COCA-COLA COMPANY, Atlanta, GA (US)

(72) Inventors: Jurgen Roekens, Kapenhout (BE); Abram C. Knip, TX Heemstede (NL); Jacobus P. M. Dessing, CV Hoofddorp (NL)

(73) Assignee: THE COCA-COLA COMPANY, Atlanta, GA (US)

( * ) Notice: Subject to any disclaimer, the term of this patent is extended or adjusted under 35 U.S.C. 154(b) by 41 days.

(21) Appl. No.: 15/114,428

(22) PCT Filed: Jan. 30, 2015

(86) PCT No.: PCT/US2015/013698
§ 371 (c)(1),
(2) Date: Jul. 27, 2016

(87) PCT Pub. No.: WO2015/116903
PCT Pub. Date: Aug. 6, 2015

(65) Prior Publication Data
US 2016/0348962 A1 Dec. 1, 2016

Related U.S. Application Data

(60) Provisional application No. 61/934,246, filed on Jan. 31, 2014.

(51) Int. Cl.
F25D 31/00 (2006.01)
F25B 15/00 (2006.01)
(Continued)

(52) U.S. Cl.
CPC .......... *F25D 31/00* (2013.01); *A47J 31/4403* (2013.01); *B67D 1/0857* (2013.01); *F25B 9/14* (2013.01);
(Continued)

(58) Field of Classification Search
CPC .. F25D 31/002; F25D 2331/806; F25D 31/00; F25D 31/006; F25B 9/14;
(Continued)

(56) References Cited

U.S. PATENT DOCUMENTS 529,190 A * 11/1894 Popp ................... A61L 2/07
422/302
2,498,401 A * 2/1950 Duncan ................ A01J 5/04
119/14.09
(Continued)

FOREIGN PATENT DOCUMENTS

CA 2466296 A1 * 5/2003 ........... F25D 31/007
CA 2466296 A1 * 5/2003 ............. F25B 17/08
(Continued)

OTHER PUBLICATIONS

JP2006284162 English Machine Translation—Retrieved May 2018.*
(Continued)

*Primary Examiner* — Len Tran
*Assistant Examiner* — Jenna M Hopkins

(57) ABSTRACT

Vacuum cooling assemblies for cooling a beverage are disclosed herein. In an embodiment, the vacuum cooling assembly may include a container compartment, a container disposed within the container compartment, and at least one beverage supply line in communication with the container compartment. The at least one beverage supply line may be configured to supply the beverage to the container within the container compartment. The vacuum cooling assembly also may include at least one vapor trap in communication with
(Continued)

the container compartment. Moreover, the vacuum cooling assembly may include a vacuum pump in communication with the at least one vapor trap. The vacuum pump may be configured to create a vacuum in the at least one vapor trap and the container compartment, causing at least a portion of the beverage to evaporate, thereby vacuum cooling the beverage within the container.

12 Claims, 10 Drawing Sheets

(51) Int. Cl.
    *B67D 1/08*         (2006.01)
    *F25D 19/00*      (2006.01)
    *F25B 17/08*      (2006.01)
    *A47J 31/44*      (2006.01)
    *F25B 9/14*       (2006.01)
    *F25D 29/00*      (2006.01)
    *F16K 17/04*      (2006.01)
    *F16K 17/00*      (2006.01)
    *F24F 3/14*       (2006.01)
    *B64D 11/00*     (2006.01)
(52) U.S. Cl.
    CPC ............ *F25B 15/004* (2013.01); *F25B 17/08* (2013.01); *F25D 19/00* (2013.01); *F25D 29/00* (2013.01); *F25D 31/002* (2013.01); *F25D 31/006* (2013.01); *B64D 11/0007* (2013.01); *B67D 2210/00104* (2013.01); *F16K 17/003* (2013.01); *F16K 17/04* (2013.01); *F24F 3/1423* (2013.01); *F24F 2203/10* (2013.01); *F25D 2331/806* (2013.01)
(58) Field of Classification Search
    CPC ........ F25B 19/00; F25B 17/08; F25B 15/004; B67D 1/0857; B67D 2210/00104; F16K 17/003; F16K 17/04; B64D 11/0007; F24F 3/1423; F24F 2203/10
    USPC ............................................ 62/238.3; 99/454
    See application file for complete search history.

(56) References Cited

U.S. PATENT DOCUMENTS

| | | | | |
|---|---|---|---|---|
| 5,207,073 A * | 5/1993 | Maier-Laxhuber | ..... | F25B 17/08 62/269 |
| 5,347,830 A * | 9/1994 | Yamada | ...... | B60H 1/3201 62/481 |
| 5,415,012 A * | 5/1995 | Maier-Laxhuber | ..... | F25D 31/00 62/269 |
| 5,440,896 A * | 8/1995 | Maier-Laxhuber | ..... | F25B 17/08 62/269 |
| 5,636,522 A * | 6/1997 | Ramos | ...... | A47G 19/2227 62/294 |
| 5,816,069 A * | 10/1998 | Ebbeson | ...... | F25B 35/04 62/457.9 |
| 6,012,265 A * | 1/2000 | Ady | ...... | B65B 31/028 141/DIG. 1 |
| 6,272,867 B1 * | 8/2001 | Barrash | ...... | F25B 9/14 62/6 |
| 6,412,295 B2 * | 7/2002 | Weiss | ...... | F24F 3/1417 62/238.3 |
| 6,467,609 B1 * | 10/2002 | Williams | ...... | B41F 17/22 198/370.12 |
| 6,474,100 B1 * | 11/2002 | Smith | ...... | F25B 17/08 62/101 |
| 6,536,218 B1 * | 3/2003 | Steinmeyer | ...... | F25B 9/14 310/52 |
| 8,074,470 B2 * | 12/2011 | Maier-Laxhuber | ..... | F25B 17/08 62/480 |
| 8,770,099 B2 * | 7/2014 | Reyhanloo | ...... | A47J 31/60 134/22.12 |
| 9,364,018 B1 * | 6/2016 | Peterson | ...... | A23L 2/54 |
| 2002/0005043 A1 * | 1/2002 | Rudick | ...... | F25B 9/14 62/6 |
| 2002/0013063 A1 * | 1/2002 | Kojima | ...... | H01L 21/02071 438/734 |
| 2002/0088237 A1 * | 7/2002 | Rudick | ...... | F25D 23/006 62/6 |
| 2002/0134088 A1 * | 9/2002 | Rudick | ...... | F28D 15/0266 62/6 |
| 2002/0134089 A1 * | 9/2002 | Rudick | ...... | A47F 3/0443 62/6 |
| 2002/0134090 A1 * | 9/2002 | Rudick | ...... | F25D 23/12 62/6 |
| 2003/0014982 A1 * | 1/2003 | Smith | ...... | C09K 5/047 62/106 |
| 2005/0039485 A1 * | 2/2005 | Jeuch | ...... | F25B 17/08 62/480 |
| 2005/0061022 A1 * | 3/2005 | Maier-Laxhuber | ...... | F25C 1/16 62/480 |
| 2006/0030497 A1 * | 2/2006 | Sperling | ............ | C10M 173/025 508/208 |
| 2006/0191287 A1 * | 8/2006 | Maier-Laxhuber | ..... | F25B 17/08 62/480 |
| 2009/0000314 A1 * | 1/2009 | Kanamori | ............... | F25D 19/00 62/6 |
| 2009/0188260 A1 * | 7/2009 | Saho | ...... | F25B 9/14 62/3.6 |
| 2009/0200320 A1 * | 8/2009 | Saito | ...... | F25D 19/003 220/592.2 |
| 2009/0241564 A1 * | 10/2009 | Kinkel | ...... | F24F 3/153 62/93 |
| 2011/0006078 A1 * | 1/2011 | Hsu | ...... | B67D 3/0009 222/129 |
| 2011/0088417 A1 * | 4/2011 | Kayser | ...... | F24F 3/1423 62/94 |
| 2012/0042960 A1 * | 2/2012 | Muraki | ...... | E03F 1/007 137/41 |
| 2012/0093996 A1 * | 4/2012 | Martin | ...... | B67D 1/0046 426/589 |
| 2012/0231126 A1 * | 9/2012 | Lo Faro | ...... | A23F 5/262 426/115 |
| 2013/0129870 A1 * | 5/2013 | Novak | ...... | B01F 3/04248 426/115 |
| 2013/0291574 A1 * | 11/2013 | Athalye | ...... | F25B 15/00 62/101 |
| 2014/0326144 A1 * | 11/2014 | Novak | ...... | A23L 2/54 99/323.2 |
| 2014/0331868 A1 * | 11/2014 | Novak | ...... | B65D 85/73 99/323.2 |
| 2016/0068334 A1 * | 3/2016 | Cafaro | ...... | B65D 85/8043 426/115 |

FOREIGN PATENT DOCUMENTS

| | | | | |
|---|---|---|---|---|
| CA | 2446303 A1 * | 4/2004 | ........... | B67D 3/0009 |
| CA | 2446303 A1 * | 4/2004 | ........... | B67D 3/0009 |
| CA | 2477410 A1 * | 2/2005 | ........... | F25B 17/08 |
| CA | 2477410 A1 * | 2/2005 | ........... | F25D 31/006 |
| CA | 2882357 A1 * | 4/2014 | ........... | F17C 11/00 |
| CA | 2882357 A1 * | 4/2014 | ........... | F25D 31/007 |
| CN | 205949262 U * | 2/2017 | | |
| DE | 10327774 A1 * | 4/2005 | ........... | F24J 2/32 |
| DE | 10327774 A1 * | 4/2005 | ........... | F25B 30/04 |
| DE | 102005056245 A1 * | 6/2007 | ........... | F25B 17/08 |
| DE | 102005056245 A1 * | 6/2007 | ........... | F25D 11/027 |
| EP | 0439819 A2 * | 8/1991 | ........... | F25B 17/08 |
| EP | 0439819 A2 * | 8/1991 | ........... | F25C 1/16 |
| EP | 0543214 A1 * | 5/1993 | ........... | F25B 17/08 |
| EP | 0543214 A1 * | 5/1993 | ........... | F25D 31/007 |
| EP | 1245919 A1 * | 10/2002 | ........... | A23B 7/0205 |
| EP | 1684029 A2 * | 7/2006 | ........... | F25B 9/14 |
| EP | 1684029 A2 * | 7/2006 | ........... | F25B 9/14 |

(56) References Cited

FOREIGN PATENT DOCUMENTS

| EP | 2295907 A1 | * | 3/2011 | ............ A21C 15/00 |
|---|---|---|---|---|
| FR | 802813 A | | 9/1936 | |
| JP | 2000-283627 A | | 10/2000 | |
| JP | 2000283627 A | * | 10/2000 | |
| JP | 2000283627 A | * | 10/2000 | |
| JP | 2001206305 A | * | 7/2001 | |
| JP | 2005095888 A | * | 4/2005 | .............. F25B 17/08 |
| JP | 2005095888 A | * | 4/2005 | .............. F25B 17/08 |
| JP | 2006-284162 A | | 10/2006 | |
| JP | 2006284162 A | * | 10/2006 | |
| JP | 2006284162 A | * | 10/2006 | |
| JP | 2012171664 A | * | 9/2012 | |
| WO | WO 0120967 A2 | * | 3/2001 | |
| WO | WO 0125702 | * | 4/2001 | |
| WO | 2007128786 A1 | | 11/2007 | |
| WO | WO 2010079945 A2 | * | 7/2010 | ............... A23L 3/26 |
| WO | WO-2010079945 A2 | * | 7/2010 | ............... F25C 1/00 |
| WO | WO-2014111590 A1 | * | 7/2014 | ............... F25D 5/02 |
| WO | WO 2014111590 A1 | * | 7/2014 | ............... F25D 5/02 |
| WO | WO-2014155875 A1 | * | 10/2014 | ........... B67D 1/0895 |
| WO | WO 2014155875 A1 | * | 10/2014 | ........... B67D 3/0032 |
| WO | WO-2015053764 A1 | * | 4/2015 | ............... F24H 7/04 |
| WO | WO 2015053764 A1 | * | 4/2015 | .............. F25B 17/02 |

OTHER PUBLICATIONS

International Search Report for International Application No. PCT/US2015/013698 dated Apr. 30, 2015.

Leandre, Arnaud; Supplementary European Search Report; dated Jul. 18, 2017; pp. 1-9; European Patent Office; The Hague, Netherlands.

Huang, Jian; Chinese Office Action; dated Jul. 20, 2018; pp. 1-9; Chinese National Intellectual Property Administration; Beijing, China.

Huang, Jian; Chinese Office Action; dated May 20, 2019; pp. 1-9; Chinese National Intellectual Property Administration; Beijing, China.

Huang, Jian; Chinese Office Action; dated Sep. 24, 2019; pp. 1-22; Chinese National Intellectual Property Administration; Beijing, China.

* cited by examiner

SYSTEMS AND METHODS FOR VACUUM COOLING A BEVERAGE

CROSS REFERENCE TO RELATED APPLICATIONS

The disclosure claims priority to and the benefit of U.S. provisional patent application No. 61/934,246, filed Jan. 31, 2014, which is herein incorporated by reference in its entirety.

FIELD

The disclosure generally relates to cooling a beverage and more particularly relates to systems and methods for vacuum cooling a beverage.

BACKGROUND

Current techniques for providing a cold beverage to a consumer may include filling a refrigerated cabinet with a number of beverages. This technique unnecessarily cools a number of beverages that may not be used for an extended period. As a result, a large amount of energy is used to cool and maintain beverages that may not be consumed in the short term. Accordingly, there is a need to provide on-demand cooling of beverages.

SUMMARY

Some or all of the above needs and/or problems may be addressed by certain embodiments of systems and methods for vacuum cooling as described throughout the specification. In one embodiment, a vacuum cooling assembly for cooling a beverage dispensed into a container is disclosed herein. The vacuum cooling assembly may include a container compartment, a container disposed within the container compartment, and at least one beverage supply line in communication with the container compartment. The at least one beverage supply line may be configured to supply the beverage to the container within the container compartment. The vacuum cooling assembly also may include at least one vapor trap in communication with the container compartment. Moreover, the vacuum cooling assembly may include a vacuum pump in communication with the at least one vapor trap. The vacuum pump may be configured to create a vacuum in the at least one vapor trap and the container compartment, causing at least a portion of the beverage to evaporate, thereby vacuum cooling the beverage within the container.

In another embodiment, a vacuum cooling assembly for cooling a beverage in at least on bottle is disclosed. The vacuum cooling assembly may include a bottle compartment. The at least one bottle may be disposed within the bottle compartment. A wetted material may be disposed about the at least one bottle, and at least one vapor trap may be in communication with the bottle compartment. Moreover, a vacuum pump may be configured to create a vacuum in the at least one vapor trap and the bottle compartment, causing water to evaporate from the wetted material, thereby lowering the temperature of the wetted material and, in turn, cooling the beverage within the at least one bottle.

Other features and aspects of the vacuum cooling assemblies will be apparent or will become apparent to one with skill in the art upon examination of the following figures and the detailed description. All other features and aspects, as well as other system, method, and assembly embodiments, are intended to be included within the description and are intended to be within the scope of the accompanying claims.

BRIEF DESCRIPTION OF THE DRAWINGS

The detailed description is set forth with reference to the accompanying drawings, which are not necessarily drawn to scale. The use of the same reference numerals may indicate similar or identical items. Various embodiments may utilize elements and/or components other than those illustrated in the drawings, and some elements and/or components may not be present in various embodiments. Throughout this disclosure, depending on the context, singular and plural terminology may be used interchangeably.

DETAILED DESCRIPTION

Systems and methods for vacuum cooling a beverage are disclosed herein. In certain embodiments, the vacuum cooling assemblies disclosed herein may provide on-demand cooling of beverages. That is, beverages may be stored at ambient temperature and cooled as needed. In this manner, the vacuum cooling assemblies disclosed herein may eliminate the need for continuous refrigeration of beverages. In turn, the vacuum cooling assemblies disclosed herein may substantially reduce the amount of energy required to provide consumers with cool beverages. Other technical effects and/or solutions may become apparent throughout the disclosure.

Figure 1:
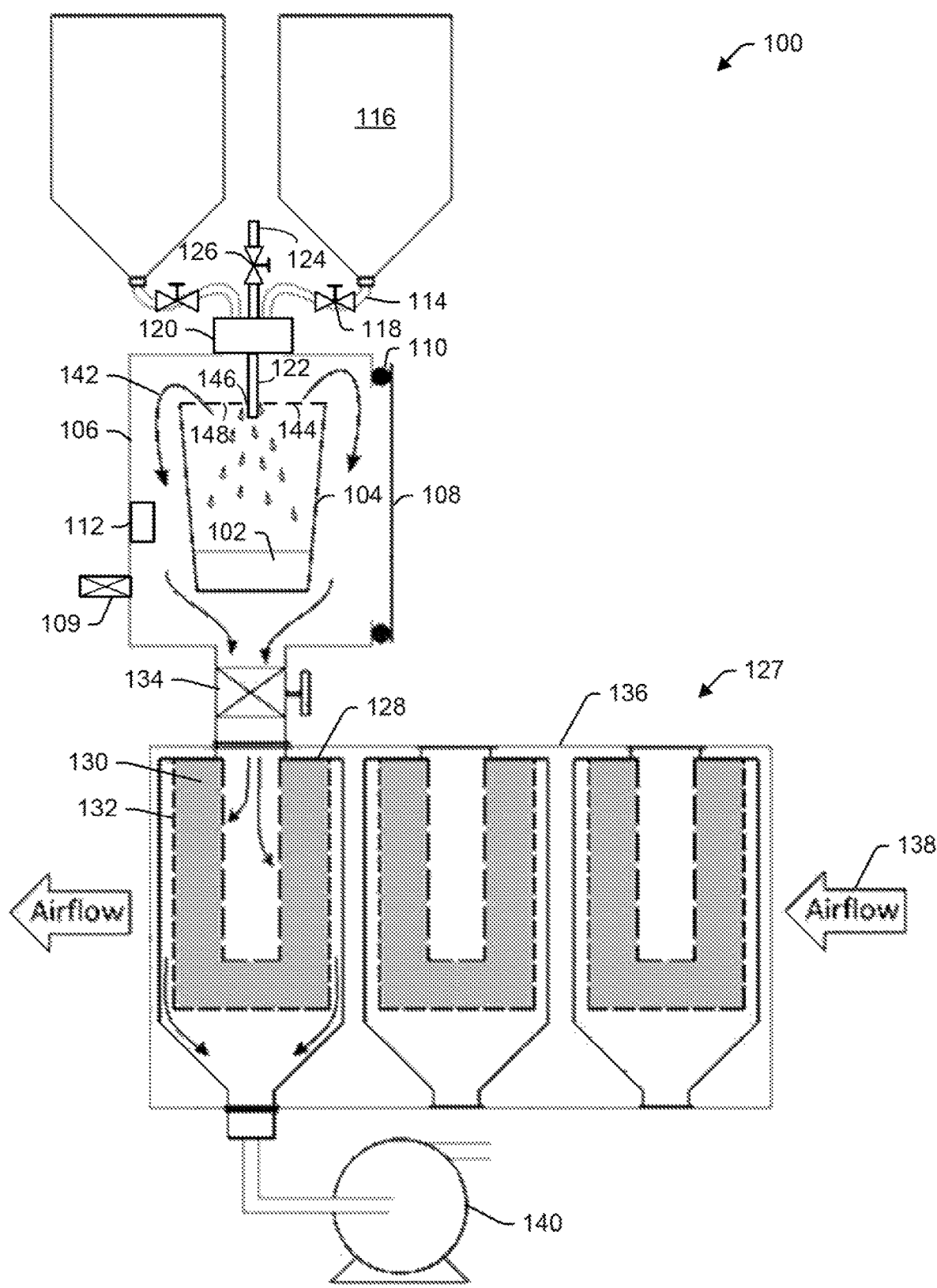
FIG. 1 schematically depicts a vacuum cooling assembly in accordance with one or more embodiments of the disclosure.

FIG. 1 depicts a vacuum cooling assembly 100 for cooling a beverage 102 dispensed into a container, such as a cup 104. The vacuum cooling assembly 100 may include a cup compartment 106. The cup 104 (or any other beverage receptacle) may be disposed within the cup compartment 106. Although described as a cup, any object capable of holding and transporting a beverage may be used. For example, the cup 104 may be a container, and the cup compartment 106 may be a container compartment. The cup compartment 106 may also be referred to as a vacuum chamber 106. The cup compartment 106 may include an access door 108. The access door 108 may be opened and closed for inserting and removing the cup 104. A seal 110 may form a hermetic seal about the access door 108 when the access door 108 is closed. In some instances, the cup compartment may include an air inlet valve 109.

In some instances, one or more sensors 112 may detect the presence of the cup 104 within the cup compartment 106. Other sensors may be used to detect whether the access door 108 is open or closed, the amount of beverage dispensed into the cup 104, the temperature of the beverage 102, the presence of a vacuum within the cup compartment 106, the pressure within the cup compartment 106, the position of one or move valves, etc. Any number of sensors 112 may be used herein. For example, the sensors 112 may include one or more weight sensors, switches, flow meters, light sensors, sonar sensors, movement sensors, temperature sensors, magnetic field sensors, vibration sensors, sound sensors, humidity and/or moisture sensors, pressure sensors, etc.

At least one beverage supply line 114 may be in communication with the cup compartment 106. The beverage supply line 114 may be configured to supply a beverage 102 to the cup 104 within the cup compartment 106. In some instances, the beverage supply line 114 may be in communication with a beverage container 116, such as a bag-in-box (BIB) container or a pre-mixed beverage container. Any beverage container may be used herein. The beverage container 116 may store a beverage at ambient temperature. The beverage may be any beverage including, but not limited to, stills, water, sparkling beverages, flavor components, concentrates, coffees, juices, sports drinks, energy drinks, etc. Other beverages also may be used herein.

The beverage supply line 114 may include a supply line valve 118 for controlling the flow within the beverage supply line 114. That is, the supply line valve 118 may be adjusted to modify the flow of beverage from the beverage container 116 to the cup 104. In some instances, the supply line valve 118 may be vacuum activated. That is, the supply line valve 118 may open when a vacuum is applied thereto. In other instances, a controller may open and close the supply line valve 118. In yet other instances, the supply line valve 118 may be opened and closed manually.

In certain embodiments, a number of beverage supply lines 114 may be used. For example, although two beverage containers 116 and beverage supply lines 114 are illustrated, any number of beverage containers 116 and beverage supply lines 114 may be used herein. To accommodate the various beverage supply lines 114, the vacuum cooling assembly 100 may include a supply line manifold 120. In this manner, the supply line manifold 120 may be in communication with the beverage supply lines 114.

The supply line manifold 120 may facilitate the dispensing of a beverage or a number of beverages (e.g., a "blend" of beverages in line with personal preferences or needs) into the cup 104. In some instances, a controller may manage the various valves and their respective flows in function of a formulae. For example, the supply line valves 118 may be adjusted to provide various mixtures, flow rates, and ratios of beverages from the beverage containers 116. The supply line manifold 120 may include a nozzle 122 for dispensing the beverage 102 (or combination of beverages) into the cup 104. In some instances, a purge line 124 and a purge valve 126 may be in communication with the supply line manifold 120 for purging the supply line manifold 120 and the beverage supply lines 114. In some instances, the purge line 124 may be in communication with an air source and/or a water source. In this manner, the purge valve 126 may allow purge air and/or water to enter the purge line 124. In some instances, the purge valve 126 may be vacuum activated. In other instances, a controller may open and close the purge valve 126. In yet other instances, the purge valve 126 may be opened and closed manually.

In an example embodiment, both postmix and premix beverages may be implemented herein. For example, the vacuum cooling assembly 100 may include a water container with a supply line to the manifold and various smaller containers with the beverage bases (e.g., "syrups") or individual beverage ingredients (e.g., beverage micro-ingredients, beverage sweeteners, high potency sweeteners, etc.).

The vacuum cooling assembly 100 may include a vapor trap 127. In some instances, the vapor trap 127 may include at least one adsorption compartment 128. Any type of vapor trap may be used herein. For example, as discussed below, an alternate vapor trap may include a heat exchanger in thermal communication with a cold source. The adsorption compartment 128 may include a sorbent material 130 therein. In some instances, the sorbent material 130 may be zeolite. Any suitable sorbent material may be used. In some instances, the sorbent material 130 may be disposed within a perforated plate 132 within the adsorption compartment 128.

The vapor trap 127 may be in communication with the cup compartment 106. For example, a vacuum valve 134 may be disposed between the cup compartment 106 and the vapor trap 127. The vacuum valve 134 may be an independent component or incorporated into the cup compartment 106, the vapor trap 127, or a combination thereof. In some instances, the vacuum valve 134 may be vacuum activated. That is, the vacuum valve 134 may open when a vacuum is applied thereto. In other instances, a controller may open and close the vacuum valve 134. In yet other instances, the vacuum valve 134 may be manually operated.

In some instances, a number of adsorption compartments 128 may be used in the vapor trap 127. For example, an adsorption compartment carousel 136 may be used. In this manner, each adsorption compartment 128 may be rotated in communication with the cup compartment 106. The adsorption compartments 128 may be rotated manually or by a drive train or other mechanical device. In some instances, the adsorption compartments 128 may be in communication with an air flow 138 for cooling the adsorption compartments 128.

A vacuum pump 140 may be in communication with the adsorption compartment 128. The vacuum pump 140 may be configured to create a vacuum in the adsorption compartment 128. Moreover, when the vacuum valve 134 is opened, the vacuum pump 140 may create a vacuum within the cup compartment 106, causing at least a portion of the beverage 102 (e.g., water) dispensed by the beverage supply line 114 into the cup 104 to evaporate. The vapor 142 may travel to the adsorption compartment 128 and be absorbed by the sorbent material 130. This process may lower the temperature of the beverage 102 in the cup 104. In one example, typical vacuum pressure is approximately 6 mbarA to achieve a temperature of 4-5° C. In some instances, an amount of about 150 ml can be cooled to this temperature within about 20-30 seconds. Any vacuum pressure may be used herein to cool any amount of beverage.

In some instances, the cup 104 may include a lid 144. The lid 144 may include an aperture 146 for the nozzle 122 to pass through. In this manner, the nozzle 122 may extend through the aperture 146 and at least partially into the interior of the cup 104. The lid 144 also may include one or more holes 148 for the vapor 142 to pass through. In other instances, the lid 144 may be omitted.

Figure 2:
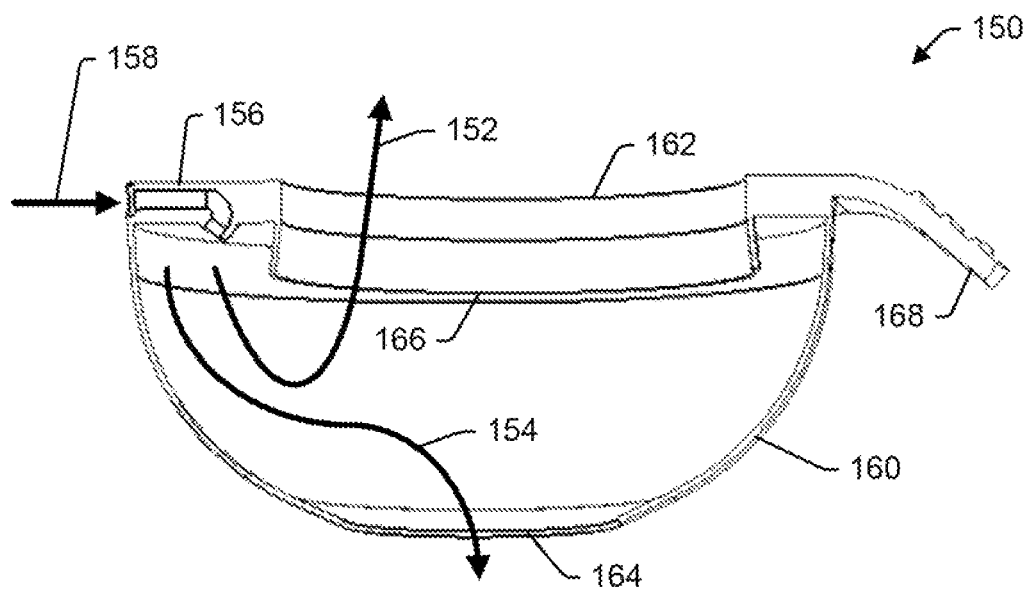
FIG. 2 schematically depicts a vapor separator in accordance with one or more embodiments of the disclosure.
Figure 3:
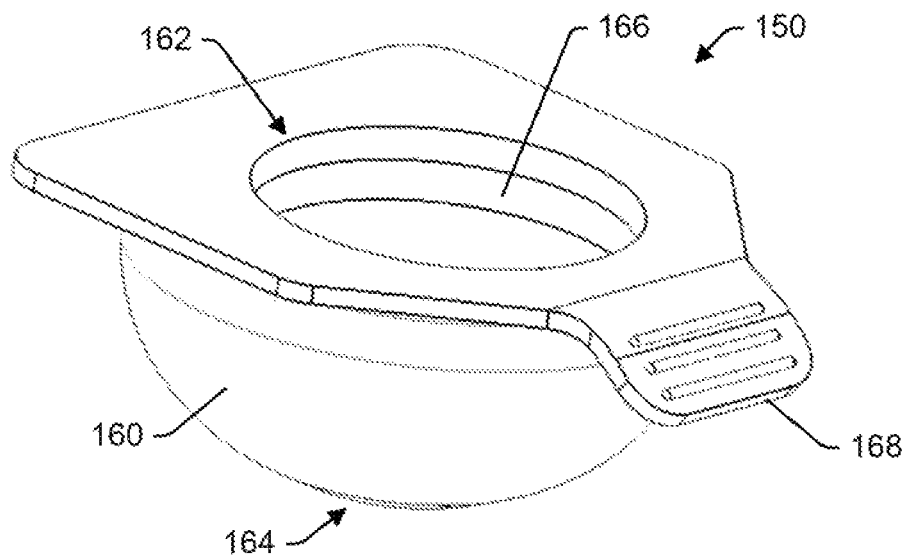
FIG. 3 schematically depicts a vapor separator in accordance with one or more embodiments of the disclosure.
Figure 4:
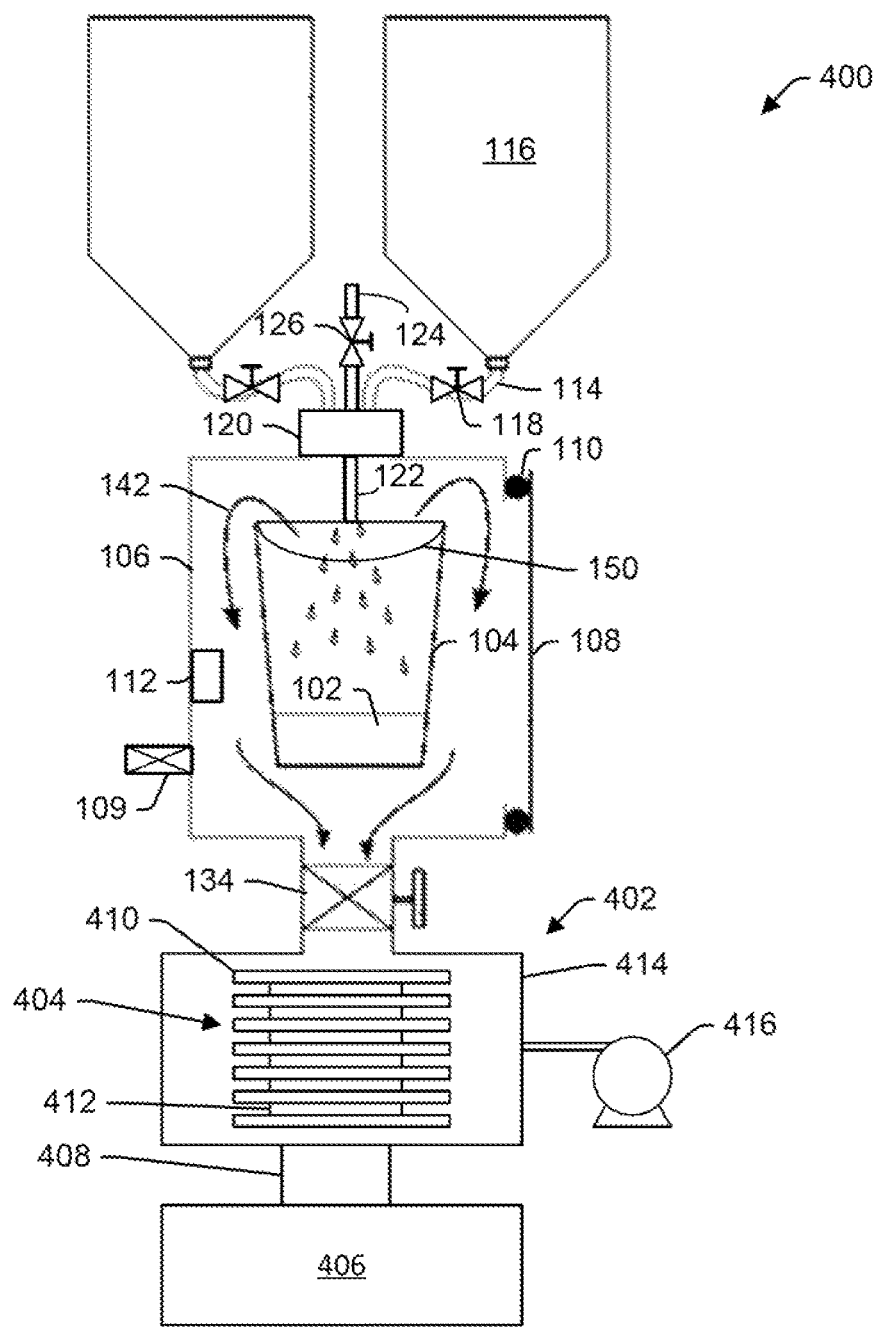
FIG. 4 schematically depicts a vacuum cooling assembly in accordance with one or more embodiments of the disclosure.

In certain embodiments, as depicted in FIGS. 2-4, a vapor separator 150 may be positioned between the cup 104 and the nozzle 122. In such instances, the lid 144 may be omitted. The vapor separator 150 may separate a vapor 152 from a cooled beverage 154. For example, the vapor separator 150 may include an inlet 156. The inlet 156 may be in fluid communication with one or more of the beverage containers 116. In some instances, the inlet 156 may be in fluid communication with the nozzle 122. In this manner, the inlet 156 may receive an ambient beverage 158 from one or more of the beverage containers 116. The vapor separator 150 also may include a funnel 160 in fluid communication with the inlet 156. In some instances, the inlet 156 may be curved towards an interior wall of the funnel 160. In this manner, the inlet 156 may inject, or otherwise provide, the ambient beverage 158 into the funnel 160. The incoming beverage 158 may spread out along a spherical surface of the funnel 160 to ensure that as much beverage surface as possible is created (e.g., a film of beverage) to in turn ensure maximum exposure to the vacuum level and instigate evaporative chilling inside the funnel 160.

The funnel 160 may include a vapor outlet 162 and a cooled beverage outlet 164. In some instances, the vapor outlet 162 may be positioned about a top portion of the funnel 160, and the cooled beverage outlet 164 may be positioned about a bottom portion of the funnel 160. A lip 166 may extend downward into the funnel 160 from the vapor outlet 162. The inlet 156 may be positioned between the interior wall of the funnel 160 and the lip 166. The vapor separator 150 may be used with any of the embodiments disclosed herein.

As the ambient beverage 158 enters the funnel 160 via the inlet 156, a portion of the beverage may evaporate into vapor 152. The vapor 152 may pass around the lip 166 and exit the funnel 160 into the cup compartment 106 by way of the vapor exit 162. As a portion of the beverage evaporates, the remaining beverage may be cooled into the cooled beverage 154. The cooled beverage 154 may exit the funnel 160 into the cup 104 by way of the cooled beverage outlet 164. In some instances, the vapor separator 150 may include a tab 168 for inserting and removing the vapor separator 150 from the cup compartment 106. For example, the vapor separator 150 may be removed and cleaned. In other instances, the vapor separator 150 may be fixed within the cup compartment 106 or form the top portion of the cup 104.

Referring back to FIG. 1, in use, the access door 108 to the cup compartment 106 may be opened. In some instances, the cup 104 may be placed within the cup compartment 106 so that the nozzle 122 extends through the aperture 146 in the lid 144 of the cup 104. In other instances, the nozzle 122 may be attached to the vapor separator 150 discussed above, and the cup 104 may be placed beneath the vapor separator 150. The access door 108 may then be closed. A desired beverage (or combination of beverages) and temperature may be selected by adjusting the supply line valves 118. The speed at which the beverage enters the vacuum may affect the temperature of the beverage. Accordingly, adjustments to the supply line valves 118 may vary the temperature of the beverage and thus dispense a finished beverage at a temperature in line with personal preferences. For example, a controller may be in communication with the supply line valve 118 to maintain the flow at a desired rate. Traditional refrigerators generally provide one temperature set point across all beverages within the cabinet. While sparkling beverages are usually preferred colder, stills may be too cold for many consumers. Moreover, as discussed below, the pressure within the cup compartment 106 may also affect the temperature of the beverage. Accordingly, the controller also may be in communication with the vacuum pump 140, the vacuum valve 134, and/or the air inlet valve 109.

The vacuum pump 140 may be activated to create a vacuum within the vapor trap 127. The vacuum valve 134 may be at least partially opened to create a vacuum in the cup compartment 106. In some instances, the vacuum inside the cup compartment 106 may draw the beverage from the beverage supply lines 114 into the cup 104 via the nozzle 122 and the supply line manifold 120. As the beverage 102 exits the nozzle 122 into the cup 104, at least a portion of the beverage 102 may evaporate. The vapor 142 may travel to the vapor trap 127 and be contained. In embodiments with the adsorption compartment 128, the vapor 142 may be absorbed by the sorbent material 130. This process may lower the temperature of the beverage 102 in the cup 104.

Once the beverage has been dispensed, the purge valve 126 may open, allowing purge air (and/or water) to enter the purge line 124. For example, the vacuum within the cup compartment 106 may draw air into the purge line 124. The purge air may then enter the supply line manifold 120, which may purge any remaining beverage in the supply line manifold 120 or the beverage supply lines 114 into the cup 104 through the nozzle 122. In some instances, one or more flavors may be injected into the beverage by way of the purge line 124. For example, the purge line 124 may be in communication with one or more flavor sources in addition to air and/or water. In some instances, the air inlet valve 109 may be at least partially opened to release the pressure within the cup compartment 106. The access door 108 may be opened, and the cup 104 may be removed from the cup compartment 106.

As the pressure lowers within the cup compartment 106, more of the beverage may evaporate, which in turn may cool the beverage. The vapor 142, however, may in turn increase the pressure within the cup compartment 106. Moreover, the rate of evaporation will increase with an increase in the flow rate of the beverage into the cup compartment 106 as well as with an increase in the ambient temperature of the beverage. The beverage will continue to evaporate until the pressure within the cup compartment 106 reaches the vapor pressure of the beverage, which varies non-linearly with temperature. For example, the vapor pressure of water at 4° C. is about 8 mBar whereas the vapor pressure of water at 10° C. is about 12 mBar. In this manner, in order to provide a beverage at a desired temperature, the pressure within the cup compartment 106 may be maintained at the vapor pressure of the beverage that corresponds to the desired temperature.

The pressure of the cup compartment 106 may be maintained at the desired vapor pressure (and hence desired beverage temperature) through sensing the pressure within the cup compartment 106 and controlling one or more valves that vary the rate of evaporation or the rate of extraction of the vapor from the cup compartment 106. For example, a controller or the like may be in communication with the one or more sensors 112 (such as a pressure sensor) within the cup compartment 106. The controller also may be in communication with the vacuum pump 140, the air inlet valve 109, the supply line valve 118, and/or the vacuum valve 134. In other instances, the air inlet valve 109, the supply line valves 118, and/or the vacuum valve 134 may be manually operated. Likewise, the vacuum pump 140 may be a manual or electric pump.

For example, the controller may maintain the desired pressure of the cup compartment 106 by opening and closing the air inlet valve 109. In this example, the air inlet valve 109 may have a variable orifice or variable flow rate controlled by the controller. In some embodiments, the controller may use a proportional-integral-derivative (PID) control algorithm to vary the air flow through the air inlet valve 109 so as to minimize the difference between the sensed pressure of the cup compartment 106 and the desired pressure (set point). By default the air inlet valve 109 may be closed. When the pressure level sensed by the pressure sensor 112 falls below the desired pressure level, the controller may proportionally open the air inlet valve 109 based on the difference between the sensed pressure in the cup compartment 106 and the desired pressure. When the pressure level exceeds the desired pressure, the controller may proportionally close the air inlet valve 109 based on the difference between the sensed pressure in the cup compartment 106 and the desired pressure. The controller may continuously adjust the air inlet valve 109 to establish a stable pressure level inside the cup compartment 106.

Similarly, the flow rate of the beverage entering the cup compartment 106 may be varied via the supply line valve 118 in order to maintain the desired pressure of the cup compartment 106. The supply line valve 118 may have a variable orifice or variable flow rate controlled by the controller. In some embodiments, the controller may use a proportional-integral-derivative (PID) control algorithm to vary the supply line valve 118 to minimize the difference between the sensed pressure of the cup compartment 106 and the desired pressure (set point). Initially, the supply line valve 118 may be set to a default flow rate by the controller. When the pressure level sensed by the pressure sensor 112 exceeds the desired pressure level, the controller may proportionally close the supply line valve 118 based on the difference between the sensed pressure in the cup compartment 106 and the desired pressure. When the pressure falls below the desired pressure, the controller may proportionally open the supply line valve 118 based on the difference between the sensed pressure in the cup compartment 106 and the desired pressure. The controller may continuously adjust the supply line valve 118 to establish a stable pressure level inside the cup compartment 106.

In some embodiments, the controller may control both the supply line valve 118 and the air inlet valve 109 in coordination with one another in order to maintain the desired pressure in the cup compartment 106. In some embodiments, the controller may additionally control the vacuum pump 140 and/or vacuum valve 134 to vary the rate at which the vapor is evacuated from the cup compartment 106.

As noted above, the adsorption compartment carousel 136 may include a number of adsorption compartments 128. The adsorption compartment carousel 136 may be rotated such that a new adsorption compartment 128 may be used for each dispensing. Using multiple adsorption compartments 128 may enable cooling several cups after each other within a short period of time. In some instances, the air flow 138 about the adsorption compartments 128 may facilitate cooling of the adsorption compartments 128.

FIG. 4 depicts a vacuum cooling assembly 400. The vacuum cooling assembly 400 may include many of the same components of the vacuum cooling assembly 100, expect instead of a sorbent vapor trap 127, the vacuum cooling assembly 400 may include a stirling cooler vapor trap 402. The cup compartment 106 may be in communication via the vacuum valve 134 with any type of the vapor trap disclosed herein. That is, the various different types of vapor traps disclosed herein may be connected to the vacuum valve 134.

In some instances, the stirling cooler vapor trap 402 may include a heat exchanger 404 in communication with a stirling cooler 406. For example, one end of the heat exchanger 404 may be in thermal communication with a cold finger 408 of the stirling cooler 406. In this manner, the heat exchanger 404 may be cooled by the stirling cooler 406. Any type of cooling means may be used herein. For example, instead of a stirling cooler, the heat exchanger 404 may be in thermal communication with an evaporator in a refrigeration cycle, or a cold material (such as ice or the like) may be disposed within the heat exchanger 404. In some instances, the heat exchanger 404 may include a number of discs 410 (or fins) separated by one or more spacers 412. The heat exchanger 404 may be aluminum or any other suitable material.

The heat exchanger 404 may be positioned within a heat exchanger compartment 414. In some instances, the discs 410 may extend the width of the heat exchanger compartment 414 and include one or more holes for fluid flow therebetween. A vacuum pump 416 may be in communication with the heat exchanger compartment 414. The vacuum pump 416 may create a vacuum within the heat exchanger compartment 414. The heat exchanger compartment 414 may be in communication with the vacuum valve 134, which may be disposed between the cup compartment 106 and the heat exchanger compartment 414.

The vacuum pump 416 may be activated to create a vacuum within the heat exchanger compartment 414. The vacuum valve 134 may be opened to create a vacuum in the cup compartment 106. The vacuum inside the cup compartment 106 may draw the beverage from the beverage supply lines 114 into the cup 104 via the nozzle 122 and the supply line manifold 120. As the beverage 102 exits the nozzle 122 into the cup 104, at least a portion of the beverage 102 may evaporate. The vapor 142 may travel through the vapor separator 150 to the heat exchanger compartment 414 where it may condense or solidify (e.g., freeze) on the heat exchanger 404, which may have been cooled by the stirling cooler 406 or other means. This process may lower the temperature of the beverage 102 in the cup 104.

As discussed above, the pressure within the cup compartment 106 may be regulated individually and/or collectively by the vacuum pump 416, the air inlet valve 109, the supply line valve 118, and/or the vacuum valve 134 to maintain an optimal vacuum pressure within the cup compartment 106. Likewise, the vacuum valve 134 may be closed, and the air inlet valve 109 may be opened to bring the cup compartment 106 to atmospheric pressure so that the access door 108 may be opened.

Figure 5:
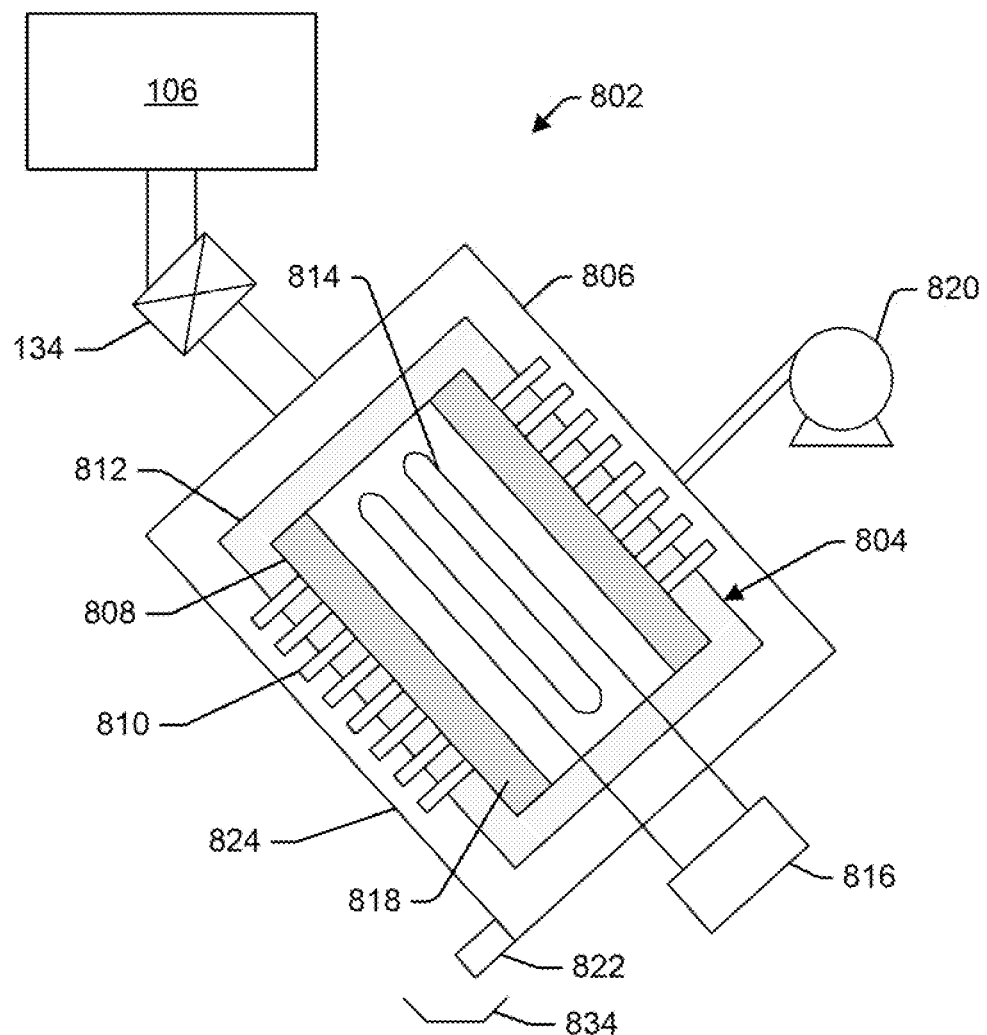
FIG. 5 schematically depicts a vacuum cooling assembly in accordance with one or more embodiments of the disclosure.

FIG. 5 depicts an alternate vapor trap 802 that may be used in conjunction with any of the embodiments disclosed herein. In an embodiment, the vapor trap 802 may be in communication with the vacuum valve 134, which may be in communication with a vacuum chamber (such as the cup compartment 106). The vapor trap 802 also may be in communication with a bottle (or closed container) compartment, as discussed below. The vapor trap 802 may include a heat exchanger 804 disposed in a heat exchanger compartment 806. The heat exchanger 804 may be angled within the heat exchanger compartment 806 and/or the heat exchanger compartment 806 may be angled so as to facilitate runoff of condensation. The heat exchanger 804 may include an outer shell 808 with a number of fins 810 extending therefrom. In some instances, the fins 810 may extend the width of the heat exchanger compartment 806 and include one or more holes for fluid flow therebetween. The outer shell 808 may include an insulation layer 812 thereabout so as to prevent water from freezing thereon. At least a portion of the fins 810, however, may be uninsulated.

As noted above, the heat exchanger 804 may be in thermal communication with a cold finger of a stirling cooler. In an alternate embodiment, the heat exchanger 804 may be in thermal communication with an evaporator 814 in a refrigeration cycle 816. For example, at least a portion of the evaporator 814 may be disposed within the outer shell 808. A phase change material 818 may be disposed within the outer shell 414 about the evaporator 814. For example, the phase change material 818 may be disposed about a perimeter of the evaporator 814 or within the interstitial space between the coils of the evaporator 814. In some instances, the evaporator 814 may be omitted. For example, although the heat exchanger 804 is depicted as being in thermal communication with an evaporator 818, the heat exchanger 804 may be in thermal communication with any device or material capable of cooling the heat exchanger 804. For example, ice or any other cold substance may be disposed within the outer shell 808 so as to cool the heat exchanger 804. Moreover, any device capable of cooling the heat exchanger 804 may be disposed within the outer shell 808. For example, the phase change material 818 may be removable from within the outer shell 808 to facilitate swapping new frozen phase change material 818 with phase change material 818 that may have melted through use.

The heat exchanger compartment 806 may be in communication with a vacuum pump 820. The vacuum pump 820 may create a vacuum within the heat exchanger compartment 806. The heat exchanger compartment 806 may be in communication with the vacuum valve 134, which may be disposed between the cup compartment 106 and the heat exchanger compartment 806. The vacuum pump 820 may be activated to create a vacuum within the heat exchanger compartment 806. The vacuum valve 134 may be opened to create a vacuum in the cup compartment 106. The vacuum in the cup compartment 106 may cause at least a portion of the beverage therein to evaporate. The vapor may travel to the heat exchanger compartment 806 where it may condense on the fins 810 of the heat exchanger 804. This process may lower the temperature of the beverage.

The fins 810 may be maintained at a temperature and/or angle so as to prevent water from freezing thereon. In one example, the fins 810 may be maintained above a freezing point. In another example, the fins 810 may be maintained below a freezing point, but water may not be present on the fins 810 long enough to freeze. In some instances, the temperature of the fins 810 may raise above 0 degrees because the condensation of the water heats up the fins 810 and the thermal conductivity between the cold kernel of the vapor trap and the fins 810 may be limited by design. The condensed water may therefore not freeze on the fin 810 surface, but may drip off the fins 810 into the heat exchanger compartment 806. In this manner, any condensation that forms on the fins 810 may drip off and into the heat exchanger compartment 806. In some instances, the heat exchanger compartment 806 may include a drainage assembly 822 for removing the fluid buildup therein. In some instances, a surface 824 of the heat exchanger compartment 806 may be sloped towards the drainage assembly 822.

Figure 6:
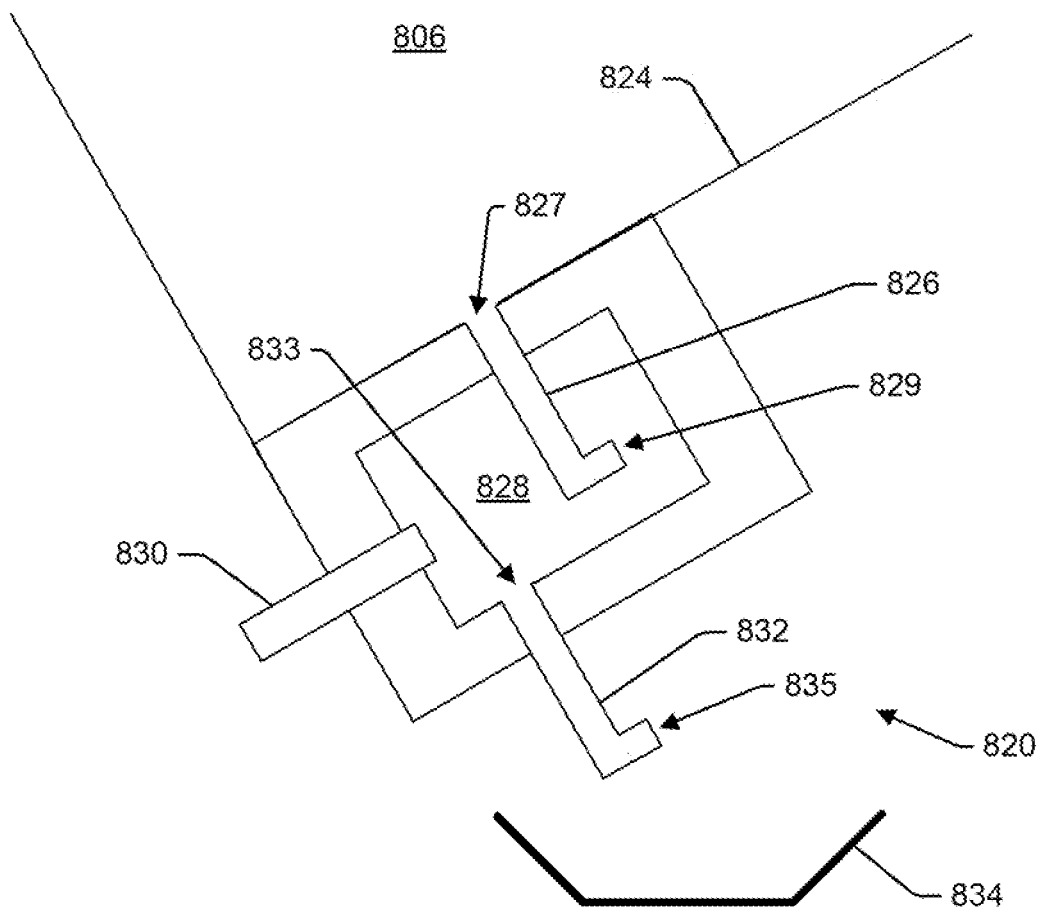
FIG. 6 schematically depicts a drainage assembly in accordance with one or more embodiments of the disclosure.

As depicted in FIG. 6, to evacuate the fluid from the heat exchanger compartment 806, the drainage assembly 820 may include a first valve 826 with an inlet 827 in communication with the heat exchanger compartment 806. The first valve 826 also may include an outlet 829 in communication with a drainage compartment 828. The drainage compartment 828 may include a vacuum connection 830. A second valve 832 may include an inlet 833 in communication with the drainage compartment 828. The second valve 832 also may include an outlet 835 in communication with the ambient environment and/or a drain pan 834. The first valve 826 and the second valve 832 may be one-way valves. In one example, the first valve 826 and the second valve 832 may include a rubber closure flap at their outlets.

When the heat exchanger compartment 806 is under vacuum, the first valve 826 may be maintained in a closed position due to the vacuum. In such instances, excess fluid may flow from the fins 810 of the heat exchanger 804, down the sloped surface 824 of the heat exchanger compartment 806, and into the first valve 826. A vacuum may be applied to the drainage compartment 828 by way of the vacuum connection 830. In such instances, the first valve 826 may open due to the pressure of the fluid in the first valve 826. The fluid may then enter the drainage compartment 828 and fill the second valve 832, which may be maintained in a closed position by the vacuum in the drainage compartment 828. Once the vacuum is no longer applied to the drainage compartment 828, the second valve 832 may open due to the pressure of the fluid therein. The fluid may then exit into the drain pan 834.

Figure 7:
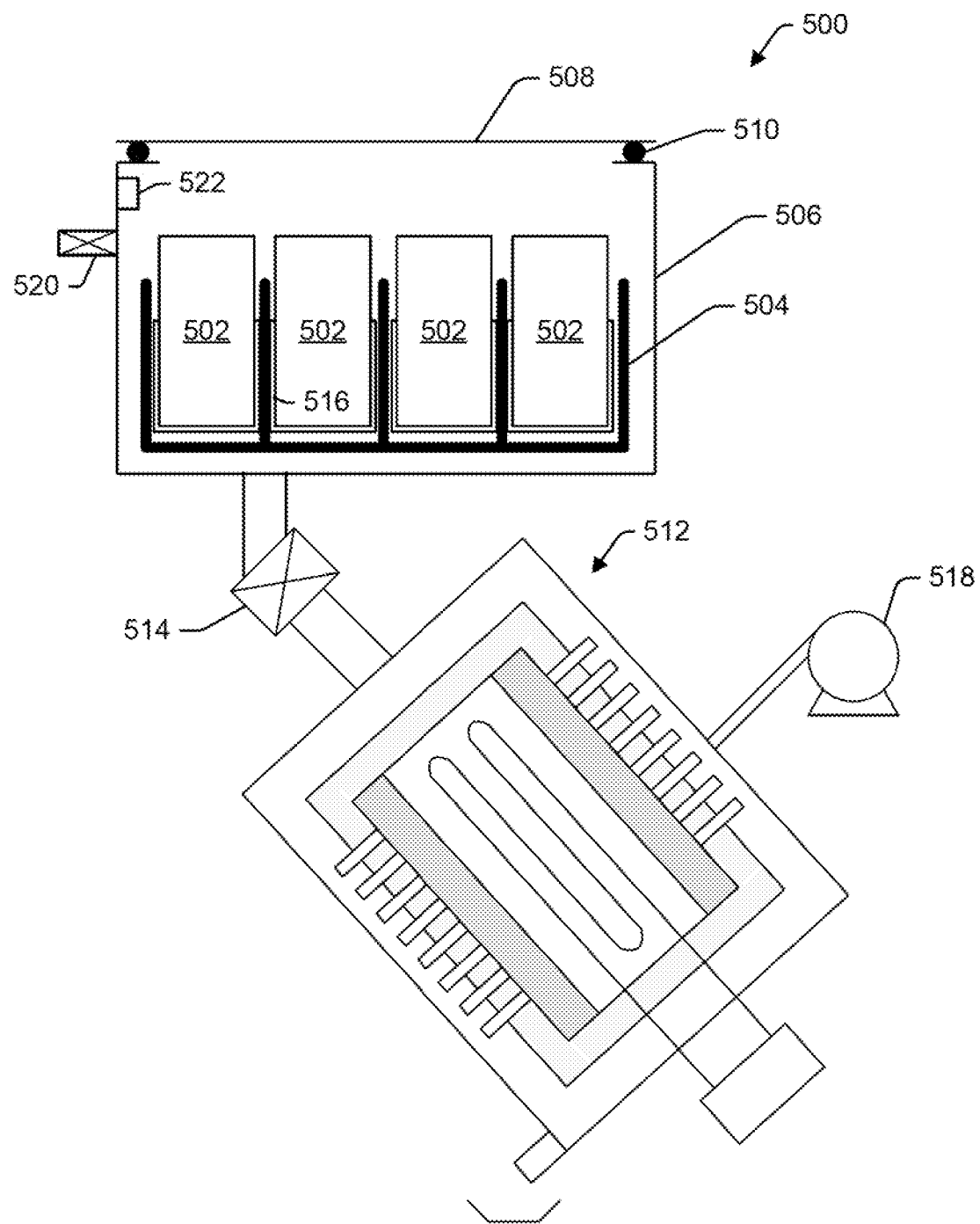
FIG. 7 schematically depicts a vacuum cooling assembly in accordance with one or more embodiments of the disclosure.

FIG. 7 depicts a vacuum cooling assembly 500 for cooling one or more bottles 502 (or other types of closed containers). The vacuum cooling assembly 500 may include a bottle compartment 506, which also may be referred to as a container compartment 506. The bottle compartment 506 may be sized to fit at least one bottle 502 (or other type of closed container) therein. In some instances, the bottle compartment 506 may be sized to fit one bottle 502 therein. In other instances, a number of bottles 502 may be disposed within the bottle compartment 506. For example, a crate 504, which may hold a number of bottles 502, may be disposed within the bottle compartment 506. Although described as a bottle, any object capable of holding and transporting a beverage may be used. The bottle compartment 506 may include an access door 508. The access door 508 may be opened and closed for inserting and removing the one or more bottles 502 or the crate 504 of bottles 502. A seal 510 may form a hermetic seal about the access door 508 when the access door 508 is closed.

One or more sensors 522 may be disposed within the bottle compartment 506. In some instances, the sensors 522 may detect the presence of the at least one bottle 502 (or crate 504) within the bottle compartment 506. Other sensors 522 may be used to detect whether the access door 508 is open or closed, the temperature of the bottles 502, the presence of a vacuum within the bottle compartment 506, the pressure within the bottle compartment 506, the position of one or move valves, etc. Any number of sensors 522 may be used herein. For example, the sensors 522 may include one or more weight sensors, switches, flow meters, light sensors, sonar sensors, movement sensors, temperature sensors, magnetic field sensors, vibration sensors, sound sensors, humidity and/or moisture sensors, pressure sensors, etc.

The vacuum cooling assembly 500 may include a vapor trap 512. In some instances, the vapor trap 512 may be in fluid communication with the bottle compartment 506. Any type of the vapor trap may be used herein. For example, any of the vapor trap configurations described above may be used. For example, an absorption compartment vapor trap, a stirling cooler vapor trap, a refrigeration cycle vapor trap, and/or a heat exchanger with a cold material disposed therein may be used. The vapor trap 512 may be in communication with the bottle compartment 506. For example, a vacuum valve 514 may be disposed between the bottle compartment 506 and the vapor trap 512. In some instances, the vacuum valve 514 may be vacuum activated. That is, the vacuum valve 514 may open when a vacuum is applied thereto. In other instances, a controller may open and close the vacuum valve 514. In yet other instances, the vacuum valve 514 may be manually operated.

A wetted material 516 may be disposed about the bottles 502 within the bottle compartment 506. In certain embodiments, the wetted material 516 may include a cloth or the like soaked in water. In some instances, the wetted material 516 may form a sleeve about each of the bottles 502. Any suitable material may be used herein. The wetted material 516 may be dampened, soaked, saturated, etc., with water and then placed about the bottle 502. Each bottle 502 may include a corresponding sleeve of wetted material, or a single wetted material may be disposed about a number of bottles 502.

A vacuum pump 518 may be in communication with the vapor trap 512. The vacuum pump 518 may be configured to create a vacuum in the vapor trap 512. Moreover, when the vacuum valve 514 is opened, a vacuum may be created within the bottle compartment 506, causing at least a portion of the water in the wetted material 516 to evaporate. The vapor from the wetted material 516 may travel to the vapor trap 512, where it may condense and/or be drained off This process may lower the temperature of the wetted material 516, which, in turn, may lower the temperature of the beverage in the bottles 502.

In some instances, the bottle compartment 506 may include an air inlet valve 520. The air inlet valve 520 may be activated to release the vacuum inside the bottle compartment 506 once the bottles 502 have been cooled. For example, the vacuum valve 514 may be closed, and the air inlet valve 520 may be opened. In this manner, the cooled bottles 502 may be accessed via the access door 508. The air inlet valve 520 may be manually activated or in communication with a controller.

As the pressure is reduced in the bottle compartment 506, more water may evaporate from the wetted material, resulting in the wetted material 516 becoming colder. However, if the pressure within the bottle compartment 506 becomes too low, the wetted material 516 may freeze, which may be undesirable. Moreover, the vapor from the wetted material 516 may affect the pressure within the bottle compartment 506. Accordingly, in some instances, the air inlet valve 520 may operate similar to the air inlet valve 109 described above, or may work in conjunction with the vacuum valve 514 and/or the vacuum pump 518 to maintain a desired pressure within the bottle compartment 506. For example, a controller may be in communication with one or more sensors 522, such as a pressure sensor, within the bottle compartment 506. The controller also may be in communication with the vacuum pump 518, the air inlet valve 520, and/or the vacuum valve 514. In this manner, the controller may maintain the pressure within the bottle compartment 506 at an optimal level by adjusting, individually or collectively, the vacuum pump 518, the air inlet valve 520, and/or the vacuum valve 514. The controller may be similar to the controller discussed above. In other instances, the vacuum pump 518, the air inlet valve 520, and/or the vacuum valve 514 may be manually operated.

Figure 8:
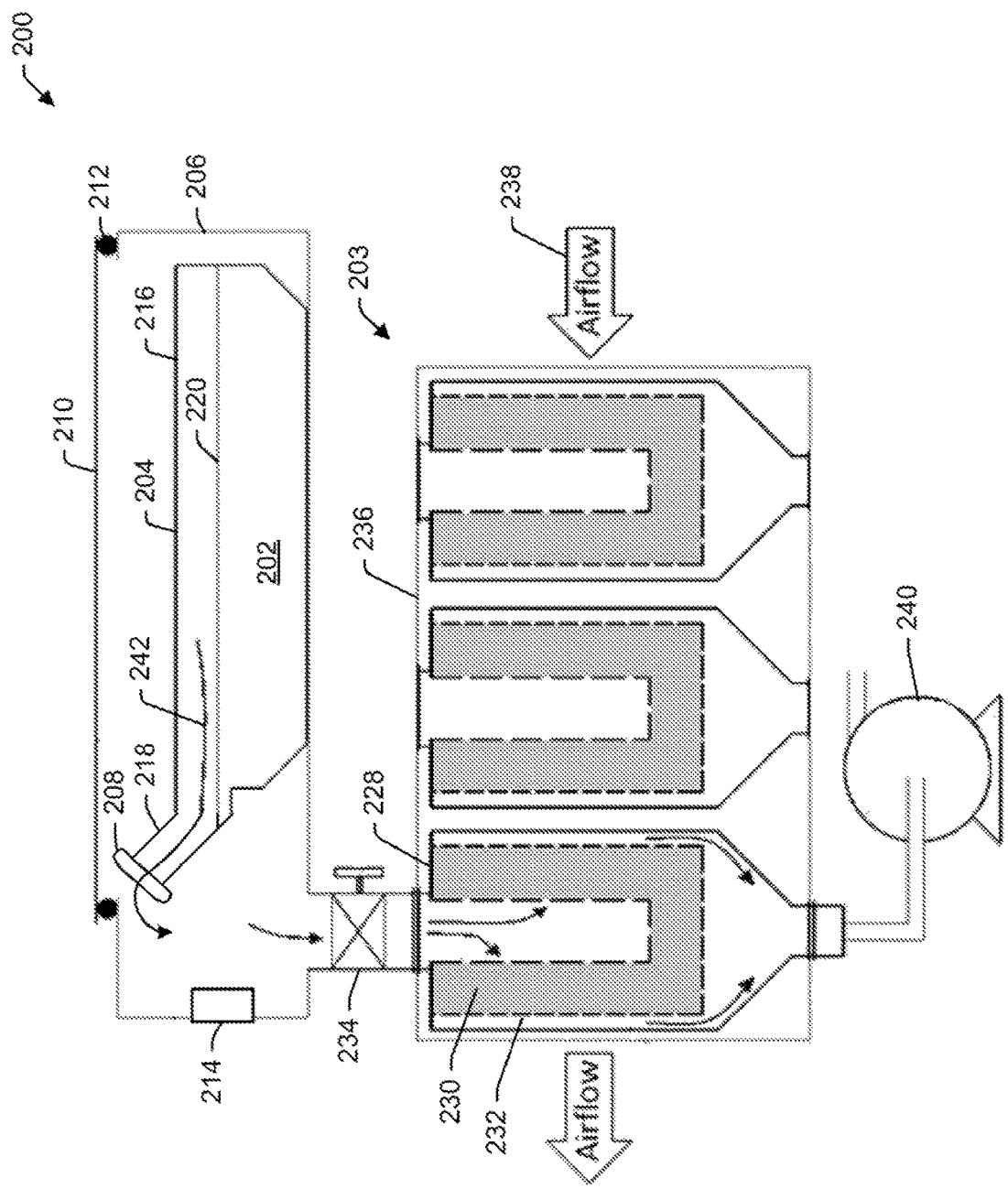
FIG. 8 schematically depicts a sectional view of a vacuum cooling assembly in accordance with one or more embodiments of the disclosure.

FIG. 8 depicts a vacuum cooling assembly 200 for cooling a beverage 202 contained in a bottle 204. The vacuum cooling assembly 200 may include a bottle compartment 206. The bottle 204 may be disposed within the bottle compartment 206. In some instances, the bottle 204 may include a vacuum valve cap assembly 208. The vacuum valve cap assembly 208 may be configured to open when a vacuum is applied thereto. In other instances, the vacuum valve cap assembly 208 may be omitted, and the bottle 204 may include an opening. Although described as a bottle, any object capable of holding and transporting a beverage may be used.

The bottle compartment 206 may include an access door 210. The access door 210 may be opened and closed for inserting and removing the bottle 204. A seal 212 may form a hermetic seal about the access door 210 when the access door 210 is closed. In some instances, one or more sensors 214 may detect the presence of the bottle 204 within the bottle compartment 206. Other sensors 214 may be used to detect whether the access door 210 is open or closed, the temperature of the beverage 202, the presence of a vacuum within the bottle compartment 206, the position of one or move valves, etc. Any number of sensors 214 may be used herein. For example, the sensors 214 may comprise one or more weight sensors, switches, flow meters, light sensors, sonar sensors, movement sensors, temperature sensors, magnetic field sensors, vibration sensors, sound sensors, humidity and/or moisture sensors, pressure sensors, etc.

The vacuum cooling assembly 200 also may include a vapor trap 203. In some instances, the vapor trap 203 may include at least one adsorption compartment 228. Any type of the vapor trap may be used herein. For example, any of the vapor trap configurations described above may be used. For example, an absorption compartment vapor trap, a stirling cooler vapor trap, a refrigeration cycle vapor trap, and/or a heat exchanger with a cold material disposed therein may be used. The adsorption compartment 228 may include a sorbent material 230 therein. In some instances, the sorbent material 230 may be zeolite. Any suitable sorbent material may be used. In some instances, the sorbent material 230 may be disposed within a perforated plate 232 within the adsorption compartment 228. The adsorption compartment 228 may be in communication with the bottle compartment 206. For example, a vacuum valve 234 may be disposed between the bottle compartment 206 and the adsorption compartment 228. In some instances, the vacuum valve 234 may be vacuum activated. That is, the vacuum valve 234 may open when a vacuum is applied thereto. In other instances, a controller may open and close the vacuum valve 234. In yet other instances, the vacuum valve 234 may be manually operated.

In some instances, a number of adsorption compartments 228 may be used. For example, an adsorption compartment carousel 236 may be used. In this manner, each adsorption compartment 228 may be rotated in communication with the cup compartment 206. The adsorption compartments 228 may be rotated manually or by a drive train or other mechanical device. In some instances, the adsorption compartments 228 may be in communication with an air flow 238 for cooling the adsorption compartments 228.

A vacuum pump 240 may be in communication with the adsorption compartment 228. The vacuum pump 240 may be configured to create a vacuum in the adsorption compartment 228. Moreover, when the vacuum valve 234 is opened, the vacuum pump 240 may create a vacuum within the bottle compartment 206, causing the vacuum valve cap assembly 208 to open and at least a portion of the beverage 202 (e.g., water) within the bottle 204 to evaporate. The vapor 242 may travel to the adsorption compartment 228 and be absorbed by the sorbent material 230. This process may lower the temperature of the beverage 202 in the bottle 204. In one example, typical pressure level may be 6 mbarA and time to cool an amount of about 300 ml is about 30-40 seconds.

The bottle 204 may include a body portion 216 and a neck portion 218. The neck portion 218 may be angled relative to the body portion 216 so as to prevent liquid from leaking out of the bottle 204 when the vacuum valve cap assembly 208 is open. In some instances, the body portion 216 of the bottle 204 may be generally rectangular in shape to maximize the surface area 220 of the beverage 202 within the bottle 204. Increased surface area 220 better facilitates cooling of the beverage 202 through evaporation. The body portion 216 may be any shape configured to maximize the surface area 220 of the beverage 202.

In use, the access door 210 to the bottle compartment 206 may be opened. The bottle 204 may be placed within the bottle compartment 206. The access door 210 may then be closed. The vacuum pump 240 may be activated to create a vacuum within the adsorption compartment 228. The vacuum valve 234 may be opened to create a vacuum in the bottle compartment 206. The vacuum inside the bottle compartment 206 may open the vacuum valve cap assembly 208. For example, the cap valve assembly 208 may automatically open as soon as the vacuum is applied and close when atmospheric pressure is back. Once the vacuum valve cap assembly 208 is open, at least a portion of the beverage 202 (e.g., water) within the bottle 204 may evaporate. The vapor 242 may travel to the adsorption compartment 228 and be absorbed by the sorbent material 230. This process may lower the temperature of the beverage 202 within the bottle 204. The access door 210 may be opened and the bottle 204 removed from the bottle compartment 206.

As noted above, the adsorption compartment carousel 236 may include a number of adsorption compartments 228. The adsorption compartment carousel 236 may be rotated such that a new adsorption compartment 228 may be used each time the beverage 202 within a bottle 204 is cooled. Using multiple adsorption compartments 228 may enable cooling several bottles 204 after each other within a short period of time. In some instances, the air flow 238 about the adsorption compartments 228 may facilitate cooling of the adsorption compartments 228.

Figure 9:
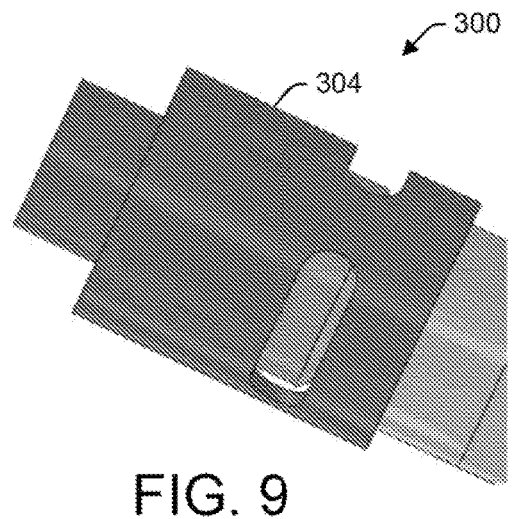
FIG. 9 schematically depicts a vacuum valve cap assembly in accordance with one or more embodiments of the disclosure.
Figure 10:
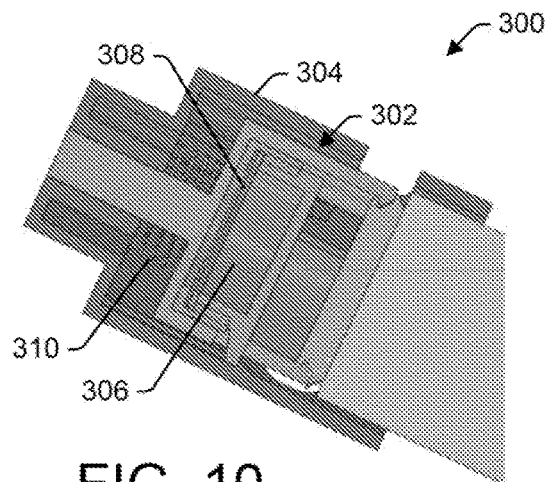
FIG. 10 schematically depicts a sectional view of a vacuum valve cap assembly in accordance with one or more embodiments of the disclosure.
Figure 11:
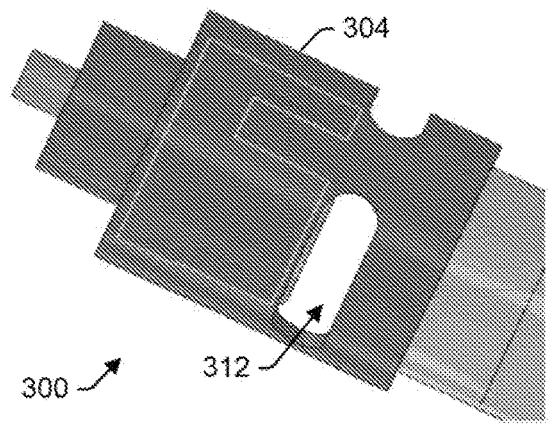
FIG. 11 schematically depicts a vacuum valve cap assembly in accordance with one or more embodiments of the disclosure.
Figure 12:
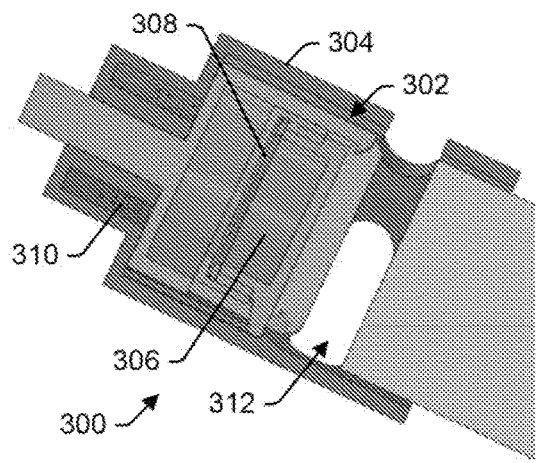
FIG. 12 schematically depicts a sectional view of a vacuum valve cap assembly in accordance with one or more embodiments of the disclosure.

FIGS. 9-12 depict a vacuum valve cap assembly 300 as may be used herein. FIGS. 9 and 10 depict the vacuum valve cap assembly 300 in the closed configuration, and FIGS. 11 and 12 depict the vacuum valve cap assembly 300 in the open configuration. In certain embodiments, the vacuum valve cap assembly 300 may include an inner valve assembly 302 and an outer casing 304. The inner valve assembly 302 may include an inner pressure box 306 and a membrane 308. A spring 310 may be positioned between the outer casing 304 and the inner valve assembly 302. The spring 310 may be configured to bias the inner valve assembly 302 in the closed configuration. When a vacuum is applied about the vacuum valve cap assembly 300, the inner pressure box 306 and the membrane 308 may counteract the spring 310 to create an opening 312. When the vacuum is no longer present, the spring 310 may urge the inner valve assembly 302 back to the closed configuration.

Figure 13:
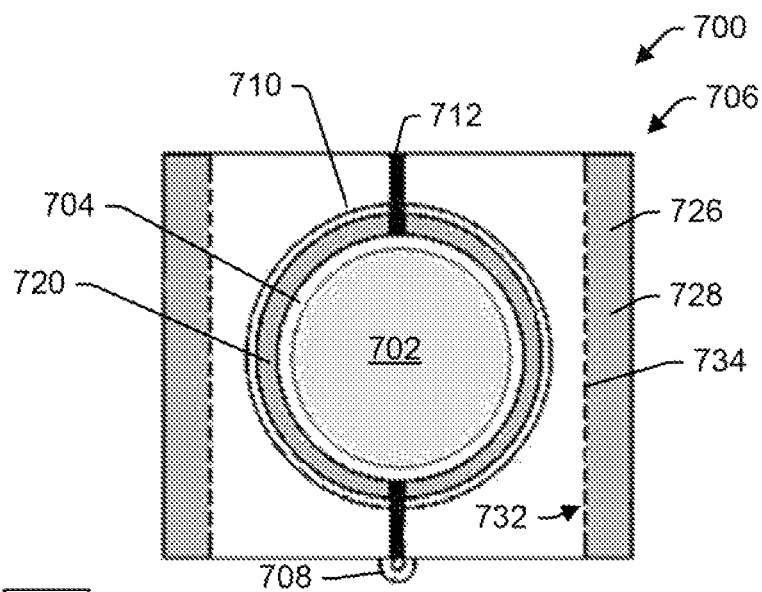
FIG. 13 schematically depicts a sectional view of a vacuum cooling assembly in accordance with one or more embodiments of the disclosure.
Figure 14:
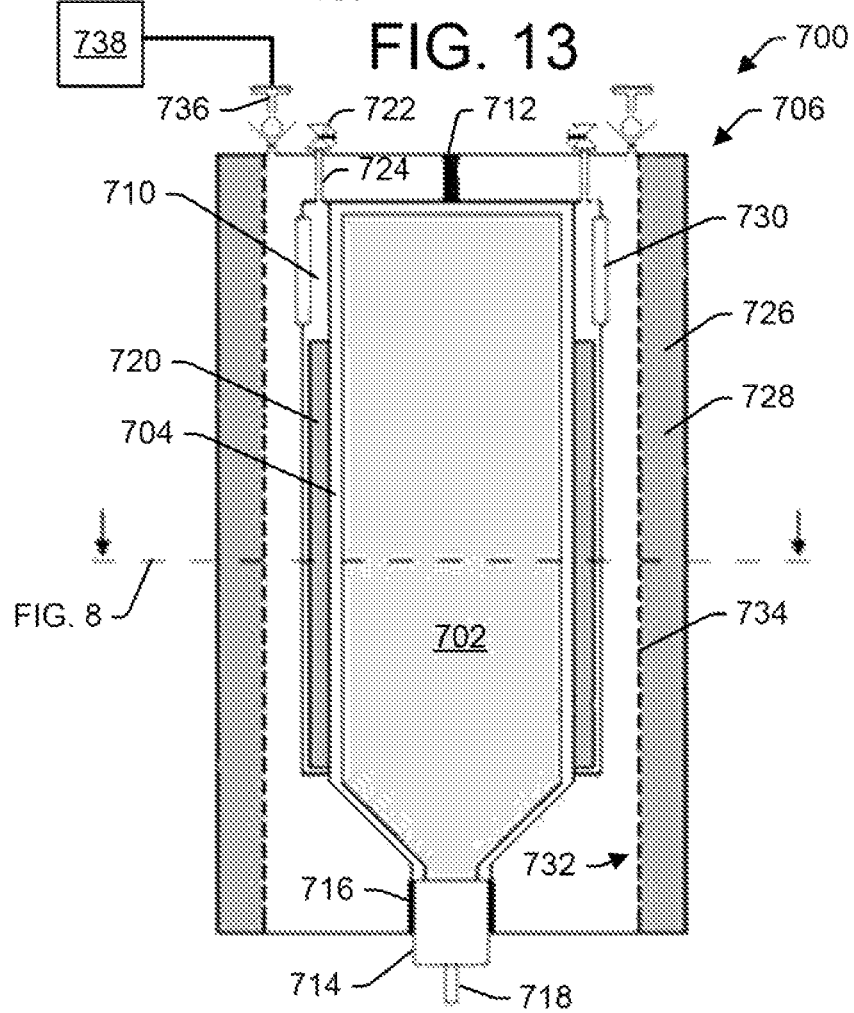
FIG. 14 schematically depicts a sectional view of a vacuum cooling assembly in accordance with one or more embodiments of the disclosure.

FIGS. 13 and 14 depict a vacuum cooling assembly 700 for cooling a beverage 702 contained in a bottle 704. The vacuum cooling assembly 700 may include a canister 706. The canister 706 may include a hinge 708 for opening and closing the canister 706. The canister 706 may include an inner bottle compartment 710 configured to house the bottle 704 therein. For example, the canister 706 may be opened about the hinge 708, and the bottle 704 may be placed within the inner bottle compartment 710. The canister 706 may then be closed. A seal 712 may form a hermetic seal about the inner bottle compartment 710 when the canister 706 is closed.

The bottle 704 may be in communication with a tap assembly 714. The tap assembly 714 may be configured to dispense the beverage 702 from the bottle 704. A seal 716 may form a hermetic seal about the tap assembly 714 and the inner bottle compartment 710. The tap assembly 714 may include a nozzle 718 disposed outside of the inner bottle compartment 710. The nozzle 718 may be manipulated to dispense the beverage 702 from the bottle 704. For example, the nozzle 718 may include a lever or the like for dispensing the beverage 702 from the bottle 704. Moreover, the nozzle 718 may include a conduit for air to enter the bottle 704 and a conduit for the beverage 702 to pass through. Any suitable tap assembly 714 and nozzle 718 capable of selectively dispensing the beverage 702 from the bottle 704 may be used herein.

A wetted material 720 may be disposed about the bottle 704 within the inner bottle compartment 710. In certain embodiments, the wetted material 720 may include a cloth or the like soaked in water. In some instances, the wetted material 720 may form a sleeve about the bottle 704. Any suitable material may be used herein. In certain embodiments, water may be added to the inner bottle compartment 710 to soak the wetted material 720. For example, a water valve 722 and a water conduit 724 may be in communication with the inner bottle compartment 710. The water valve 722 and the water conduit 724 may be in communication with an external water source (not shown). In other instances, the water valve 722 and the water conduit 724 may be omitted. In such instances, the wetted material 720 may be dampened, soaked, saturated, etc., with water and then placed about the bottle 704.

The canister 706 may include an adsorption compartment 726. The adsorption compartment 726 may include a sorbent material 728 therein. In some instances, the sorbent material 728 may be zeolite. Any suitable sorbent material may be used. The adsorption compartment 726 may be in communication with the inner bottle compartment 710. For example, an internal vacuum valve 730 may be disposed between the inner bottle compartment 710 and the adsorption compartment 726. In some instances, the internal vacuum valve 730 may be vacuum activated. That is, the internal vacuum valve 730 may open when a vacuum is applied thereto. In other instances, the internal vacuum valve 730 may be omitted. In such instances, the inner bottle compartment 710 may be in communication with the adsorption compartment 726 by way of one or more holes 732. For example, a perforated plate 734 may separate the inner bottle compartment 710 from the adsorption compartment 726.

A vacuum pump valve 736 may be in communication with the adsorption compartment 726. The vacuum pump valve 736 may be in communication with an external vacuum pump 738. The external vacuum pump 738 may be configured to create a vacuum in the adsorption compartment 726. Moreover, when the internal vacuum valve 730 is opened, the external vacuum pump 738 may create a vacuum within the inner bottle compartment 710, causing at least a portion of the water in the wetted material 720 to evaporate. The vapor from the wetted material 720 may travel to the adsorption compartment 726 and be absorbed by the sorbent material 728. This process may lower the temperature of the wetted material 720, which, in turn, may lower the temperature of the beverage 702 in the bottle 704. In one example, typical pressure may be around 6 mbarA. In some instances, cooling time for a bottle of 2 liters may be about 1 hour.

In certain embodiments, the vacuum pump 738 may be disconnected from the canister 706. The vacuum inside the canister 706, however, may continue to evaporate water from the wetted material 720 after the external vacuum pump 738 is disconnected until all water from the wetted material 720 has evaporated. While the external vacuum pump 738 may be disconnected, the bottle will continue to be "surrounded" by vacuum, which is good for insulating the beverage in the bottle 704 after it is made cold. That is, as soon as all water has evaporated, the beverage 702 may stay at optimal drinking temperature for an extended period. Once the beverage 702 has been dispensed, the canister 706 may be opened, and the bottle 704 may be replaced with a full bottle. Moreover, the sorbent material 728 may be replaced and new water may be added.

Figure 15:
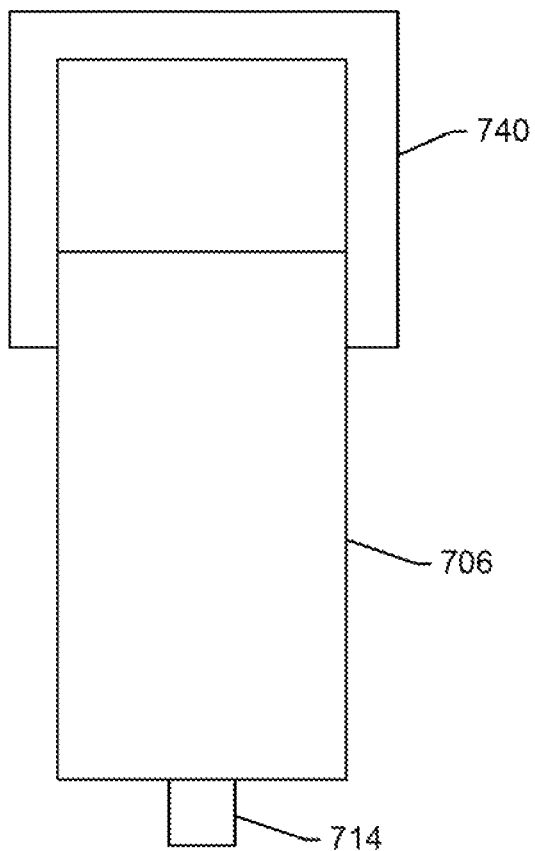
FIG. 15 schematically depicts a vacuum cooling assembly in accordance with one or more embodiments of the disclosure.
Figure 16:
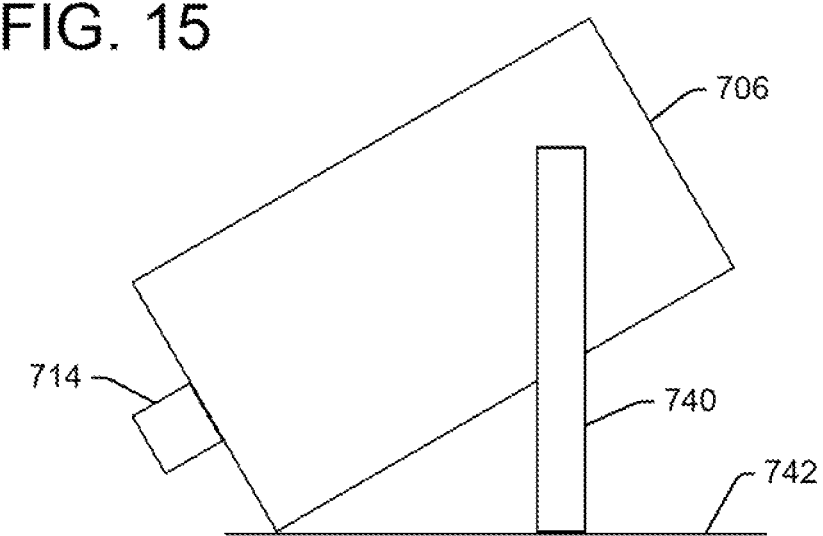
FIG. 16 schematically depicts a vacuum cooling assembly in accordance with one or more embodiments of the disclosure.

FIGS. 15 and 16 depict a handle and stand configuration for the canister 706. That is, in some instances, the canister 706 may include a handle 740. The handle 740 may be used to transport the canister 706. As depicted in FIG. 9, the handle 740 may extend upward from the canister 706. In certain embodiments, the handle 740 may be rotated about the canister 706. In such instances, the handle 740 may act as a stand for supporting the canister 706 on a surface 742, such as a countertop or the like. The stand configuration may position the canister 706 such that the tap assembly 714 may be easily accessed, and the beverage 702 may be dispensed from the bottle 704.

Although specific embodiments of the disclosure have been described, numerous other modifications and alternative embodiments are within the scope of the disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A vacuum cooling assembly for cooling a beverage dispensed into a container, the vacuum cooling assembly comprising:
   a container compartment with the container disposed entirely therein;
   at least one beverage supply line in communication with the container compartment, wherein the at least one beverage supply line is configured to supply the beverage to the container within the container compartment;
   a vacuum valve;
   at least two adsorption compartments, one of which is in communication with the container compartment via the vacuum valve, wherein the at least two adsorption compartments comprise a sorbent material therein;
   an adsorption carousel configured to rotate the at least two adsorption compartments such that each of the at least two adsorption compartments can be rotated in and out of communication with the container compartment; and
   a vacuum pump in communication with one of the at least two adsorption compartments, wherein the vacuum pump is configured to create a vacuum in one of the at least two adsorption compartments and the container compartment, causing at least a portion of the beverage to evaporate, thereby cooling the beverage within the container.

2. The vacuum cooling assembly of claim 1, wherein the sorbent material is disposed within a perforated plate within the at least two adsorption compartments.

3. The vacuum cooling assembly of claim 1, further comprising a supply line valve disposed about the at least one beverage supply line.

4. The vacuum cooling assembly of claim 1, further comprising a supply line manifold in communication with the at least one beverage supply line.

5. The vacuum cooling assembly of claim 4, further comprising a purge line and a purge valve in communication with the supply line manifold.

6. The vacuum cooling assembly of claim 4, further comprising a nozzle in communication with the supply line manifold, wherein the nozzle extends at least partially into the container.

7. The vacuum cooling assembly of claim 1, wherein the container comprises a lid having at least one aperture for receiving a nozzle and one or more vapor holes.

8. The vacuum cooling assembly of claim 1, wherein the container compartment comprises an access door.

9. The vacuum cooling assembly of claim 1, wherein the container compartment comprises one or more sensors for determining the presence of the container.

10. The vacuum cooling assembly of claim 1, further comprising at least one vapor trap.

11. The vacuum cooling assembly of claim 1, further comprising:
   one or more sensors in the container compartment;
   an air inlet valve in communication with the container compartment; and
   a controller configured to manipulate one or more of the air inlet valve and the vacuum valve based on information received from the one or more sensors to maintain a predetermined pressure within the container compartment.

12. The vacuum cooling assembly of claim 1, further comprising:
   one or more sensors in the container compartment;
   an air inlet valve in communication with the container compartment; and
   a controller configured to manipulate the air inlet valve based on information received from the one or more sensors to maintain a predetermined pressure within the container compartment.

* * * * *